US012681438B2

(12) United States Patent
Kim

(10) Patent No.: US 12,681,438 B2
(45) Date of Patent: Jul. 14, 2026

(54) ELECTRONIC DEVICE COMPRISING COUPLING MEMBER

(71) Applicant: Samsung Electronics Co., Ltd., Suwon-si (KR)

(72) Inventor: Donghyun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 327 days.

(21) Appl. No.: 18/505,648

(22) Filed: Nov. 9, 2023

(65) Prior Publication Data

US 2024/0069494 A1 Feb. 29, 2024

Related U.S. Application Data

(63) Continuation of application No. PCT/KR2022/004000, filed on Mar. 22, 2022.

(30) Foreign Application Priority Data

May 18, 2021 (KR) ........................ 10-2021-0063940

(51) Int. Cl.

*G04B 37/14* (2006.01)
*A44C 5/14* (2006.01)
*G04G 99/00* (2010.01)

(52) U.S. Cl.

CPC .......... *G04B 37/1486* (2013.01); *A44C 5/147* (2013.01); *G04G 99/006* (2013.01)

(58) Field of Classification Search

None

See application file for complete search history.

(56) References Cited

U.S. PATENT DOCUMENTS 2,659,765 A * 11/1953 Dunn ................... H02G 3/0683 285/202
5,751,104 A * 5/1998 Soules .................... H01J 9/247 313/493

(Continued)

FOREIGN PATENT DOCUMENTS

CN 2627546 Y 7/2004
CN 201948138 U * 8/2011 ........... A44C 5/2057

(Continued)

OTHER PUBLICATIONS

Espacenet combined translation of CN 201948138 (Year: 2025).*

(Continued)

*Primary Examiner* — Regis J Betsch
*Assistant Examiner* — Michael James Walker
(74) *Attorney, Agent, or Firm* — Jefferson IP Law, LLP

(57) ABSTRACT

An electronic device is provided. The electronic device includes a housing, at least one coupling member configured to be connected to the housing, a bracket disposed between the housing and the at least one coupling member and including a first through hole and a second through hole, and a connecting member at least partially disposed within the at least one coupling member, wherein the connecting member includes a first protruding area configured to be inserted into the first through hole and a second protruding area configured to be inserted into the second through hole, wherein the first protruding area is configured to rotate within a first angular range in the first through hole, and the second protruding area is configured to rotate within the first angular range in the second through hole.

15 Claims, 8 Drawing Sheets

(56) References Cited

U.S. PATENT DOCUMENTS

| | | | | |
|---|---|---|---|---|
| 6,176,612 | B1 | 1/2001 | Chagnoux | |
| 7,507,018 | B2 * | 3/2009 | Hozumi | A44C 5/14 368/282 |
| 7,526,840 | B2 | 5/2009 | Pernu et al. | |
| 10,327,520 | B1 | 6/2019 | Ely | |
| 2003/0002394 | A1 | 1/2003 | Kinkio et al. | |
| 2006/0126445 | A1 | 6/2006 | Bouille | |
| 2008/0068933 | A1 | 3/2008 | Chevalier et al. | |
| 2008/0159085 | A1 | 7/2008 | Hozumi et al. | |
| 2020/0390202 | A1 | 12/2020 | Xue et al. | |
| 2020/0405017 | A1 | 12/2020 | Hu et al. | |
| 2021/0015220 | A1 * | 1/2021 | Xue | A44C 5/14 |

FOREIGN PATENT DOCUMENTS

| | | | |
|---|---|---|---|
| CN | 206433907 | U | 8/2017 |
| CN | 109991831 | A | 7/2019 |
| EP | 0683993 | A1 | 11/1995 |
| EP | 2098131 | A2 | 9/2009 |
| JP | 2008-164428 | A | 7/2008 |

OTHER PUBLICATIONS

Leviton lightbulb socket, (https://web.archive.org/web/20200812181827/https://store.leviton.com/products/one-piece-glazed-porcelain-outlet-box-mount-incandescent-lampholder-white-49875) pub. Aug. 12, 2020, accessed Nov. 26, 2025 (Year: 2020).*

European Search Report dated Sep. 13, 2024, issued in European Application No. 22804820.3.

Korean Office Action dated Oct. 24, 2025, issued in Korean Application No. 10-2021-0063940.

International Search Report and written opinion dated Jun. 6, 2022, issued in International Application No. PCT/KR2022/004000.

* cited by examiner

ELECTRONIC DEVICE COMPRISING COUPLING MEMBER

CROSS-REFERENCE TO RELATED APPLICATION(S)

This application is a continuation application, claiming priority under § 365(c), of an International application No. PCT/KR2022/004000, filed on Mar. 22, 2022, which is based on and claims the benefit of a Korean patent application number 10-2021-0063940, filed on May 18, 2021, in the Korean Intellectual Property Office, the disclosure of which is incorporated by reference herein in its entirety.

BACKGROUND

1. Field

The disclosure relates to an electronic device including a coupling member.

2. Description of Related Art

Electronic devices may refer to devices that perform specific functions based on embedded programs, such as home appliances, electronic notes, portable multimedia players (PMPs), mobile communication terminals, tablet personal computers (PCs), video/audio devices, desktop/laptop computers, vehicle navigation systems, and so forth. For example, these electronic devices may output stored information in the form of sound or images. With the increasing integration of electronic devices and the common use of ultra-high-speed and large-volume wireless communication, various functions have recently come to be provided in a single electronic device, such as a mobile communication terminal. For example, various functions such as an entertainment function such as gaming, a multimedia function such as music/video playback, a communication and security function for mobile banking, and a function such as a schedule management or electronic wallet, as well as a communication function have been integrated into a single electronic device. Such electronic devices have become compact such that users can conveniently carry and wear them. With development of electronic/communication technologies, such electronic devices have become compact/lightweight such that they can be used without any inconvenience even when worn on the body.

The above information is presented as background information only to assist with an understanding of the disclosure. No determination has been made, and no assertion is made, as to whether any of the above might be applicable as prior art with regard to the disclosure.

SUMMARY

Electronic devices wearable on a user's body may remain in continuous contact with the user's body for a significant period of time. There is a growing demand for coupling members with various colors, materials, or shapes to match different situations or enhance the aesthetics of the electronic device. As a result, research is being conducted to enhance the convenience of the connection between the housing and the coupling member. Additionally, in wearable electronic devices, there is an increasing need for a compact connection structure between the housing and the coupling member to achieve device miniaturization.

Aspects of the disclosure are to address at least the above-mentioned problems and/or disadvantages and to provide at least the advantages described below. Accordingly, an aspect of the disclosure is to provide an electronic device including a coupling member that can be easily mounted or separated from a housing.

Another aspect of the disclosure is to provide an electronic device with increased arrangement space and durability.

Additional aspects will be set forth in part in the description which follows and, in part, will be apparent from the description, or may be learned by practice of the presented embodiments.

In accordance with an aspect of the disclosure, an electronic device is provided. The electronic device includes a housing, at least one coupling member configured to be connected to the housing, a bracket disposed between the housing and the at least one coupling member and including a first through hole and a second through hole, and a connecting member at least partially disposed in the at least one coupling member and including a first protruding area configured to be inserted into the first through hole and a second protruding area configured to be inserted into the second through hole, wherein the first through hole and the second through hole may be formed to be spaced apart from each other by a first length with respect to a first point located between the first through hole and the second through hole, and wherein the first protruding area may be configured to rotate within a first angular range in a first through hole, and the second protruding area may be configured to rotate within the first angular range in the second through hole.

In accordance with another aspect of the disclosure, an electronic device is provided. The electronic device includes a housing, at least one coupling member configured to be connected to the housing, a bracket disposed between the housing and the at least one coupling member and including a first through hole and a second through hole, and a connecting member at least partially disposed in the at least one coupling member and including a first protruding area configured to be inserted into the first through hole and a second protruding area configured to be inserted into the second through hole, wherein the first through hole and the second through hole may include a separation area at least partially formed to have a second diameter, and a fastening area extending from the separation area and at least partially formed to have a third diameter shorter than a length of the second diameter, wherein the first protruding area and the second protruding area may be formed to have a first diameter, and a length of the first diameter may be shorter than the length of the second diameter and longer than a length of the third diameter.

According to various embodiments of the disclosure, an electronic device may include a coupling member that can be easily mounted or separated from a housing. The replacement of the coupling member may enhance user convenience.

According to various embodiments of the disclosure, the coupling member to be worn on the user's body may be connected to the housing through a twist fastening operation using a bracket and a connecting member. Since a strap pin or button for connecting the coupling member and the housing is not required, the arrangement space of the electronic device may be increased and durability may be increased.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
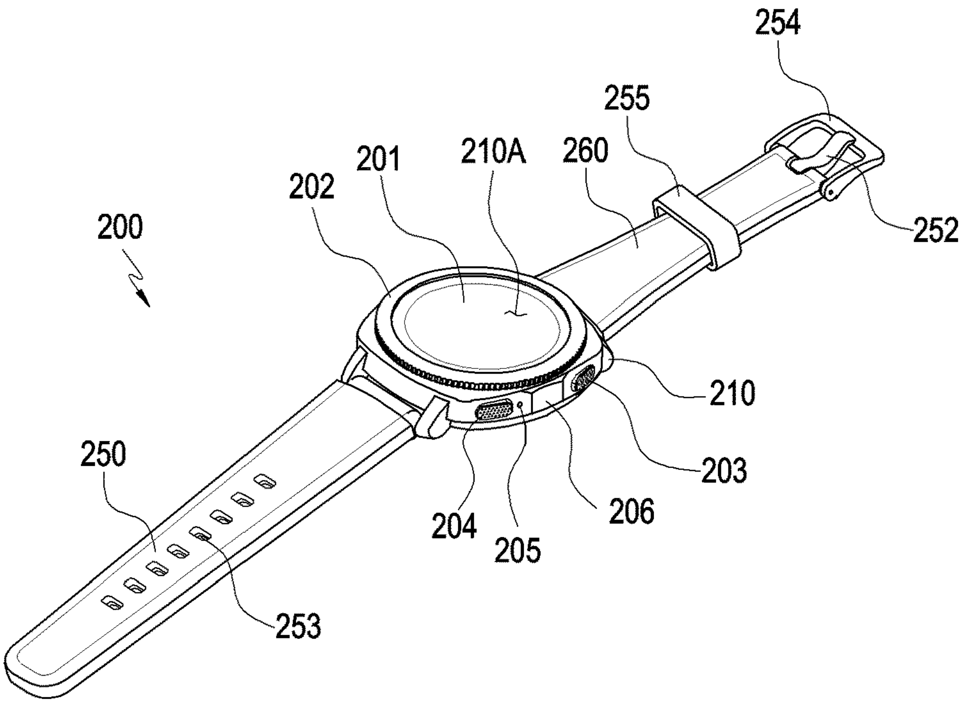
FIG. 1 is a front perspective view of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a front perspective view of an electronic device according to an embodiment of the disclosure.

Figure 2:
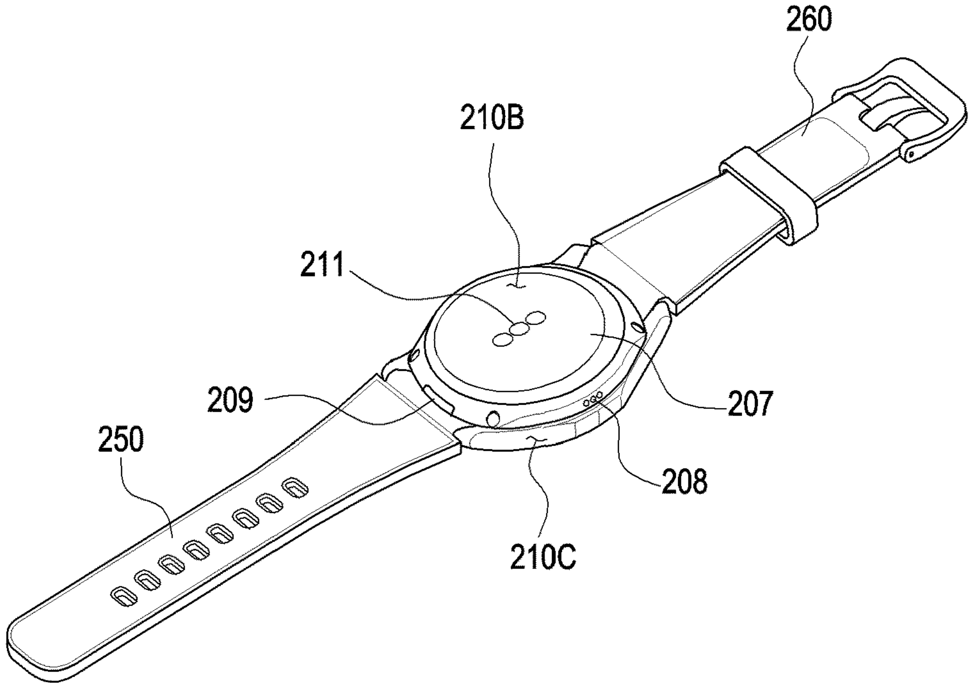
FIG. 2 is a rear perspective view of the electronic device of FIG. 1 according to an embodiment of the disclosure.

FIG. 2 is a rear perspective view of the electronic device of FIG. 1 according to an embodiment of the disclosure.

Referring to FIGS. 1 and 2, an electronic device 200 is a watch-type electronic device, allowing users to wear the electronic device 200. For example, the electronic device 200 may be a smart watch or a wearable electronic device that may be worn on the user's wrist.

The electronic device 200 according to an embodiment may include a housing 210 including a first surface (or front surface) 210A, a second surface (or rear surface) 210B, and a side surface 210C surrounding a space between the first surface 210A and the second surface 210B, and coupling members 250 and 260 connected to at least a portion of the housing 210 and configured to removably bind the electronic device 200 on a portion of a user's body (e.g., a wrist, an ankle, etc.).

In another embodiment (not illustrated), a housing 210 may refer to a structure forming part of the first surface 210A, the second surface 210B, and the side surface 210C. According to an embodiment, at least a portion of the first surface 210A may be formed by a substantially transparent front plate 201 (e.g., a glass plate or a polymer plate including various coating layers). The second surface 210B may be formed by a substantially opaque rear plate 207. The rear plate 207 may be formed of, for example, coated or colored glass, ceramic, polymer, metal (e.g., aluminum, stainless steel (STS), or magnesium), or a combination of two or more of these materials. The side surface 210C may be formed by a side bezel structure 206 (or a "side member") coupled to the front plate 201 and the rear plate 207 and including metal and/or polymer. In some embodiments, the rear plate 207 and the side bezel structure 206 may be integrally configured, and may include the same material (e.g., a metal material such as aluminum). The coupling members 250 and 260 may be formed of various materials and in various shapes. A plurality of integrated-type unit links may be formed to be movable with respect to each other using a woven material, leather, rubber, urethane, metal, ceramic, or a combination of two or more of these materials.

According to an embodiment, the electronic device 200 may include at least one of a display (e.g., the display 220 of FIG. 3), audio modules 205 and 208, a sensor module 211, key input devices 202, 203, and 204, and a connector hole 209. In some embodiments, in the electronic device 200, at least one of the components (e.g., the key input devices 202, 203, and 204, the connector hole 209, or the sensor module 211) may be omitted, or other components may be additionally included.

The display 220 may visually provide information to the outside (e.g., a user) of the electronic device 200. The display 220 may include, for example, a display panel, a hologram device, or a projector and control circuitry to control a corresponding one of the display panel, hologram device, and projector. According to an embodiment, the display 220 may include a touch sensor adapted to detect a touch, or a pressure sensor adapted to measure the intensity of force incurred by the touch.

The display 220 may be visually exposed through a significant portion of, for example, the front plate 201. The shape of the display 220 may have a shape corresponding to the shape of the front plate 201, and may have various shapes such as a circle, an ellipse, and a polygon. The display 220 may be coupled to or disposed adjacent to a touch sensing circuit, a pressure sensor capable of measuring touch intensity (pressure), and/or a fingerprint sensor.

The audio modules 205 and 208 may convert a sound into an electrical signal and vice versa. The audio modules 205 and 208 may include a microphone hole 205 and a speaker hole 208. The microphone hole 205 may include a microphone disposed therein to acquire external sound, and in some embodiments, a plurality of microphones may be disposed therein to be able to detect the direction of sound. The speaker hole 208 may be used for an external speaker and a call receiver. In some embodiments, the speaker hole 208 and the microphone hole 205 may be implemented as a single hole, or a speaker may be included without the speaker hole 208 (e.g., a piezo speaker).

The sensor module 211 may generate electrical signals or data values corresponding to the internal operating states or the external environmental states of the electronic device 200. The sensor module 211 may include, for example, a biometric sensor module 211 (e.g., a heart rate monitor (HRM) sensor) disposed on the second surface 210B of the housing 210. The electronic device 200 may further include at least one of sensor modules (not illustrated), such as a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

The key input devices 202, 203, and 204 may receive a command or data to be used by a component (e.g., the processor) of the electronic device 200, from the outside (e.g., a user) of the electronic device 200. The key input devices 202, 203, and 204 may include a wheel key 202 disposed on the first surface 210A of the housing 210 and configured to be rotatable in at least one direction, and/or side key buttons 203 and 204 disposed on the side surface 210C of the housing 210. The wheel key may have a shape corresponding to the shape of the front plate 201. In another embodiment, the electronic device 200 may not include some or all of the above-mentioned key input devices 202, 203, and 204, and a non-included key input device 202, 203, or 204 may be implemented in another form, such as a soft key on the display 220. The connector hole 209 may accommodate a connector (e.g., a universal serial bus (USB) connector) configured to transmit/receive power and/or data to/from an external electronic device, and may include another connector hole (not illustrated) capable of accommodating a connector configured to transmit/receive an audio signal to/from an external electronic device. The electronic device 200 may further include, for example, a connector cover (not illustrated), which covers at least a portion of the connector hole 209 and blocks inflow of external foreign matter into the connector hole.

Figure 4:
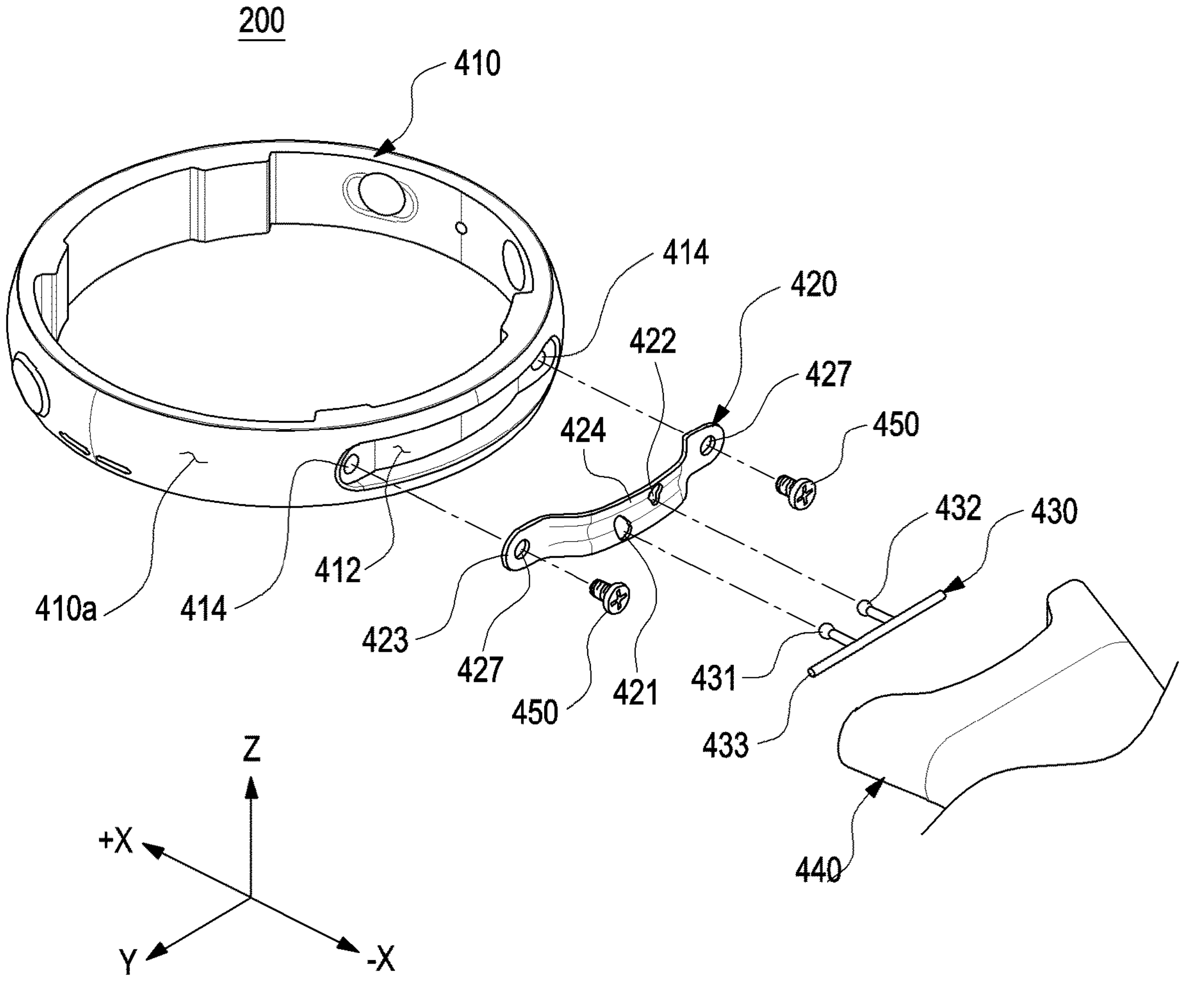
FIG. 4 is an exploded perspective view illustrating a fastening structure of an electronic device according to an embodiment of the disclosure.

The coupling members 250 and 260 may be detachably coupled to at least a portion of the housing 210 via a connecting member (e.g., the connecting member 430 of FIG. 4). The coupling members 250 and 260 may include one or more of a fastening member 252, fastening member coupling holes 253, a band guide member 254, and a band fastening ring 255.

The fastening member 252 may be configured to allow the housing 210 and the coupling members 250 and 260 to be fastened to a portion of a user's body (e.g., a wrist or an ankle). The fastening member coupling holes 253 allow the housing 210 and the coupling members 250 and 260 to be fastened to a portion of the user's body, corresponding to the fastening member 252. The band guide member 254 is configured to limit the movement range of the fastening member 252 when the fastening member 252 fits onto the fastening member coupling holes 253, thereby ensuring that the coupling members 250 and 260 are brought into close contact with and bound to a portion of the user's body. The band fastening ring 255 may limit the movement range of the coupling members 250 and 260 in the state in which the fastening member 252 and the fastening member coupling holes 253 are fastened to each other.

Figure 3:
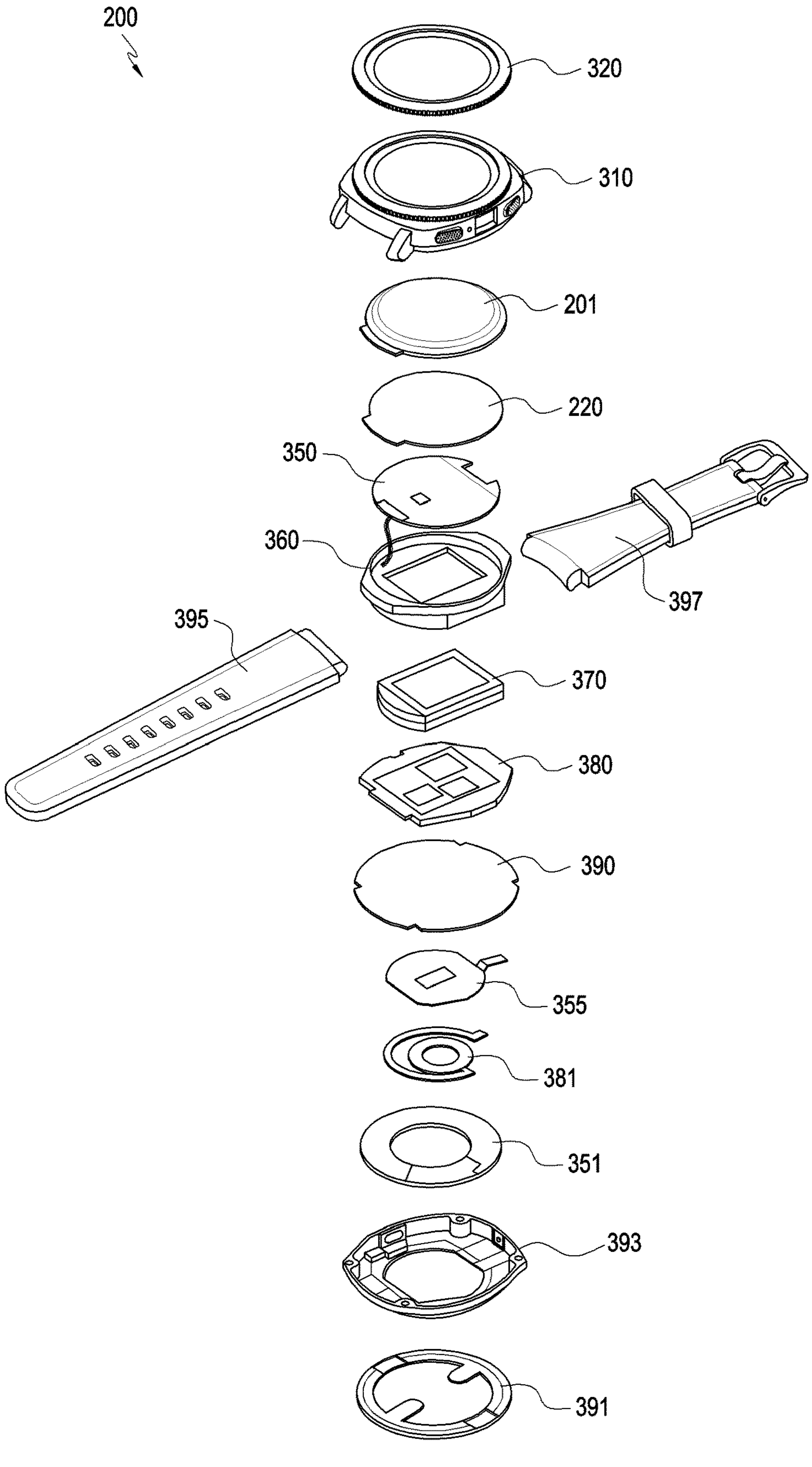
FIG. 3 is an exploded perspective view of an electronic device according to an embodiment of the disclosure.

FIG. 3 is an exploded perspective view of an electronic device according to an embodiment of the disclosure.

Referring to FIG. 3, the electronic device 200 may include a side bezel structure 310, a wheel key 320, a front plate 201, a display 220, a first antenna 350, a second antenna 351, a sensor module 355, a support member 360, a battery 370, a printed circuit board 380 (e.g., the first printed circuit board), a flexible printed circuit board 381 (e.g., the second printed circuit board), a sealing member 390, a rear plate 393, a rear cover 391, and/or and coupling members 395 and 397. At least one of the components of the electronic device 200 may be the same as or similar to at least one of the components of the electronic device 200 of FIG. 1 or FIG. 2, and a redundant description thereof will be omitted below. The support member 360 may be disposed inside the electronic device 200 and connected to the side bezel structure 310, or may be integrally configured with the side bezel structure 310. The support member 360 may be formed of, for example, a metal material and/or a non-metal (e.g., polymer) material. The support member 360 may include one surface to which the display 220 is coupled and the other surface to which the printed circuit board 380 is coupled. On the printed circuit board 380 and auxiliary printed circuit board 381, a processor, a memory, and/or an interface may be mounted.

According to various embodiments, the processor may include, for example, one or more of a central processing unit, an application processor, a graphic processing unit (GPU), an application processor sensor processor, or a communication processor. According to an embodiment, the processor may control at least one other element (e.g., hardware or software elements) of the electronic device 200 connected to the processor by executing a software (e.g., a program), and may perform various data processing or operations.

According to various embodiments, the memory may include, for example, a volatile memory or a nonvolatile memory. The interface may include, for example, a high-definition multimedia interface (HDMI), a universal serial bus (USB) interface, a secure digital (SD) card interface, and/or an audio interface. The interface may electrically or physically connect, for example, the electronic device 200 to an external electronic device, and may include a USB connector, an SD card/a multimedia card (MMC) connector, or an audio connector.

According to various embodiments, the side bezel structure 310 may function as an antenna of the electronic device 200. For example, a communication module (e.g., the communication module 190 of FIG. 1) may transmit a wireless signal to the outside by using the side bezel structure 310 or may receive a wireless signal from the outside. According to an embodiment, the side bezel structure 310 may be electrically connected to the communication module 190 located on the printed circuit board 380. According to an embodiment, the configuration of the side bezel structure 310 may be entirely or partially the same as the configuration of an antenna module (e.g., the antenna module 197 of FIG. 1). According to an embodiment, the configuration of the side bezel structure 310 may be entirely or partially the same as the configuration of the housing 210 of FIG. 1 or FIG. 2.

According to various embodiments, the battery 370 is a device for supplying power to at least one component of the electronic device 200, and may include, for example, a non-rechargeable primary battery, a rechargeable secondary battery, or a fuel cell. At least a portion of the battery 370 may be disposed on substantially the same plane as, for example, the printed circuit board 380. The battery 370 may be integrally disposed inside the electronic device 200, or may be disposed to be detachable from the electronic device 200.

According to various embodiments, the first antenna 350 may be disposed between the display 220 and the support member 360. The first antenna 350 may include, for example, a near field communication (NFC) antenna, a wireless charging antenna, and/or a magnetic secure transmission (MST) antenna. In an embodiment (e.g., FIG. 3), the first antenna 350 may be an NFC antenna. For example, the first antenna 350 may perform short-range communication with an external device, may wirelessly transmit/receive power required for charging, or may transmit a short-range communication signal or a magnet-based signal including payment data. In another embodiment, an antenna structure may be formed by a portion of the side bezel structure 310 and/or a portion of the support member 360, or a combination thereof.

According to various embodiments, the second antenna 351 may be disposed between the circuit board 380 and the rear plate 393. The second antenna 351 may include, for example, a near field communication (NFC) antenna, a wireless charging antenna, and/or a magnetic secure transmission (MST) antenna. In an embodiment (e.g., FIG. 4), the second antenna 351 may be a wireless charging antenna. For example, the second antenna 351 may perform short-range communication with an external device, may wirelessly transmit/receive power required for charging, or may transmit a short-range communication signal or a magnet-based signal including payment data. In another embodiment, an antenna structure may be formed by a portion of the side bezel structure 310 and/or a portion of the rear plate 393, or a combination thereof.

According to various embodiments, the sealing member 390 may be located between the side bezel structure 310 and the rear plate 393. The sealing member 390 may be configured to block moisture and foreign matter flowing into the space surrounded by the side bezel structure 310 and the rear plate 393 from the outside.

According to various embodiments, the rear cover 391 may be located under the rear plate 393. At least a portion of the rear cover 391 may be exposed to the outside of the electronic device 200. The rear cover 391 may cover at least a portion of the sensor module 355 and/or the auxiliary printed circuit board 381.

FIG. 4 is an exploded perspective view illustrating a fastening structure of an electronic device according to an embodiment of the disclosure.

Figure 5:
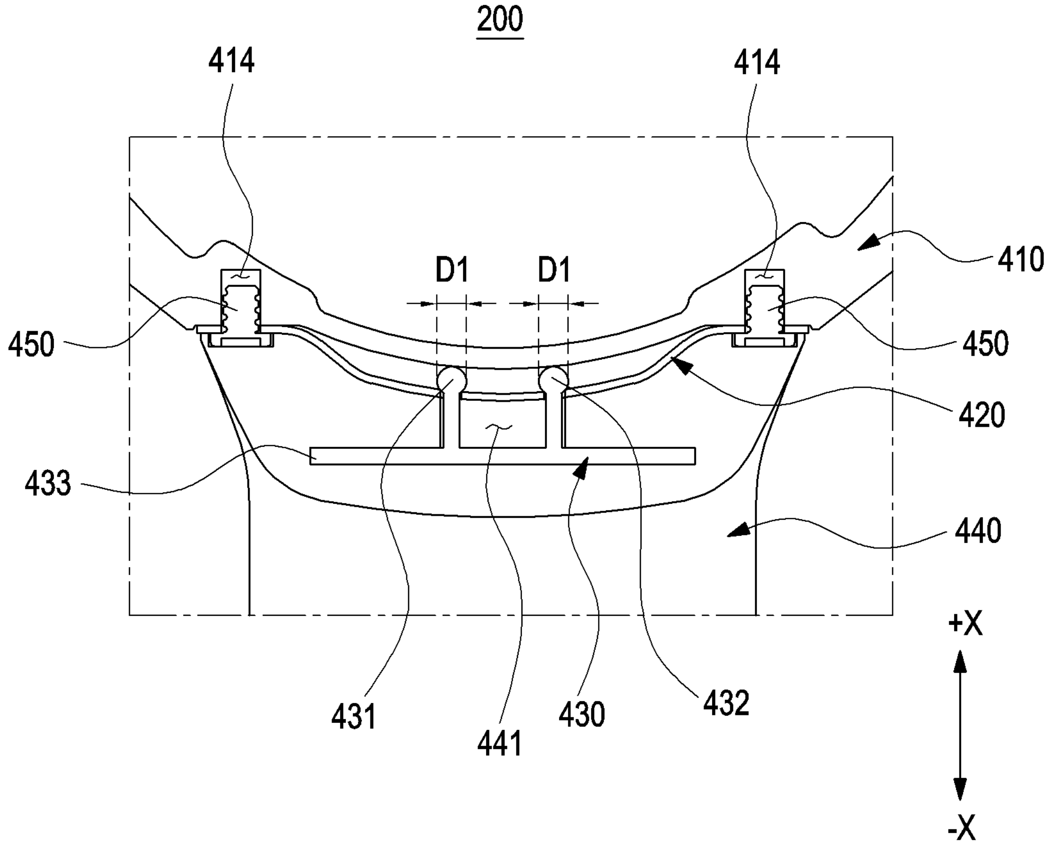
FIG. 5 is a cross-sectional view of an electronic device according to an embodiment of the disclosure.

FIG. 5 is a cross-sectional view of an electronic device according to an embodiment of the disclosure.

Referring to FIGS. 4 and 5, the electronic device 200 may include a housing 410, a bracket 420, a connecting member 430, a coupling member 440, and/or a fastening member 450. The configurations of the housing 410 and the coupling member 440 in FIGS. 4 and 5 may be entirely or partially the same as the configurations of the side bezel structure 310 and the coupling members 395 and 397 in FIG. 3.

According to various embodiments, the housing 410 may be connected to the coupling member 440. For example, the housing 410 may be connected to the coupling member 440 using the bracket 420, the connecting member 430, and/or the fastening member 450. According to an embodiment, the housing 410 may be formed of metal. For example, the housing 410 may include at least one of stainless steel, aluminum, magnesium, or titanium.

According to various embodiments, the housing 410 may include a bracket accommodating groove 412 for accommodating the bracket 420. For example, at least a portion of the bracket 420 may be disposed on the bracket accommodating groove 412. According to an embodiment, the bracket accommodating groove 412 may be a groove or a recess formed on the outer surface 410*a* of the housing 410.

According to various embodiments, the housing 410 may include at least one coupling groove 414 for accommodating the fastening member 450. According to an embodiment, the coupling groove 414 may be formed in the bracket accommodating groove 412. For example, the coupling groove 414 may be a groove or recess formed in the first direction (e.g., the +X direction) from the bracket accommodating groove 412.

According to various embodiments, the bracket 420 may include through holes 421 and 422. The through holes 421 and 422 may include a first through hole 421 and a second through hole 422. According to an embodiment, the through holes 421 and 422 may accommodate a portion of the connecting member 430. For example, the first through hole 421 may accommodate at least a portion of the first protruding area 431, and the second through hole 422 may accommodate at least a portion of the second protruding area 432. According to an embodiment, the first through hole 421 and the second through hole 422 may be located in the second bracket area 424 of the bracket 420.

According to various embodiments, the bracket 420 may include at least one coupling hole 427. According to an embodiment, the coupling hole 427 may be a through hole formed in the first bracket area 423. According to an embodiment, the coupling hole 427 may be formed to correspond to the coupling groove 414 of the housing 410. According to an embodiment, the coupling hole 427 may accommodate at least a portion of the fastening member 450. For example, the fastening member 450 may be disposed within the coupling hole 427 and the coupling groove 414 to connect or fasten the housing 410 and the bracket 420. According to an embodiment, the at least one coupling hole 427 may be located in the first bracket area 423 of the bracket 420.

According to various embodiments, the bracket 420 may include at least one first bracket area 423 connected to the housing 410, and a second bracket area 424 extending from the first bracket area 423. According to an embodiment, the first bracket area 423 may include at least one coupling hole 427. According to an embodiment, the first bracket area 423 may face the housing 410. According to an embodiment, the second bracket area 424 may include a first through hole 421 and a second through hole 422. According to an embodiment, the second bracket area 424 may be spaced apart from the housing 410. At least a portion (e.g., the first protruding area 431 and the second protruding area 432) of the connecting member 430 may be inserted into a space between the second bracket area 424 and the housing 410. According to an embodiment, the bracket 420 may be disposed between the housing 410 and the coupling member 440.

According to an embodiment, the bracket 420 may be formed of metal. For example, the bracket 420 may include at least one of stainless steel, aluminum, magnesium, or titanium.

According to various embodiments, the connecting member 430 may include protruding areas 431 and 432. The protruding areas 431 and 432 may include a first protruding area 431 and a second protruding area 432. According to an embodiment, the connecting member 430 may be connected to the bracket 420 using the first protruding area 431 and the second protruding area 432. For example, the first protruding area 431 may be inserted into the first through hole 421, and the second protruding area 432 may be inserted into the second through hole 422.

According to various embodiments, the connecting member 430 may include a bar structure 433. According to an embodiment, the bar structure 433 may be connected to the first protruding area 431 and the second protruding area 432. For example, the first protruding area 431 and the second protruding area 432 may extend in the first direction (e.g., the +X direction) or the second direction (e.g., the −X direction) from the bar structure 433.

According to various embodiments, the connecting member 430 may be connected to the coupling member 440. For example, at least a portion (e.g., the bar structure 433) of the connecting member 430 may be inserted into an inner space (e.g., the inner space 441 of FIG. 9) of the coupling member 440.

According to an embodiment, the connecting member 430 may be formed of metal. For example, the bracket 420 may include at least one of stainless steel, aluminum, magnesium, or titanium.

According to various embodiments, the coupling member 440 may be connected or coupled to the housing 410 using the bracket 420 and the connecting member 430. For example, the protruding areas 431 and 432 of the connecting member 430 connected to the coupling member 440 may be inserted into the through holes 421 and 422 of the bracket 420 connected to the housing 410.

According to various embodiments, the fastening member 450 may connect the housing 410 and the bracket 420. According to an embodiment, at least a portion of the fastening member 450 may be inserted into the coupling groove 414 of the housing 410 and the coupling hole 427 of the bracket 420. According to an embodiment, the fastening member 450 may be at least one of a bolt, screw, or boss structure.

Figure 6A:
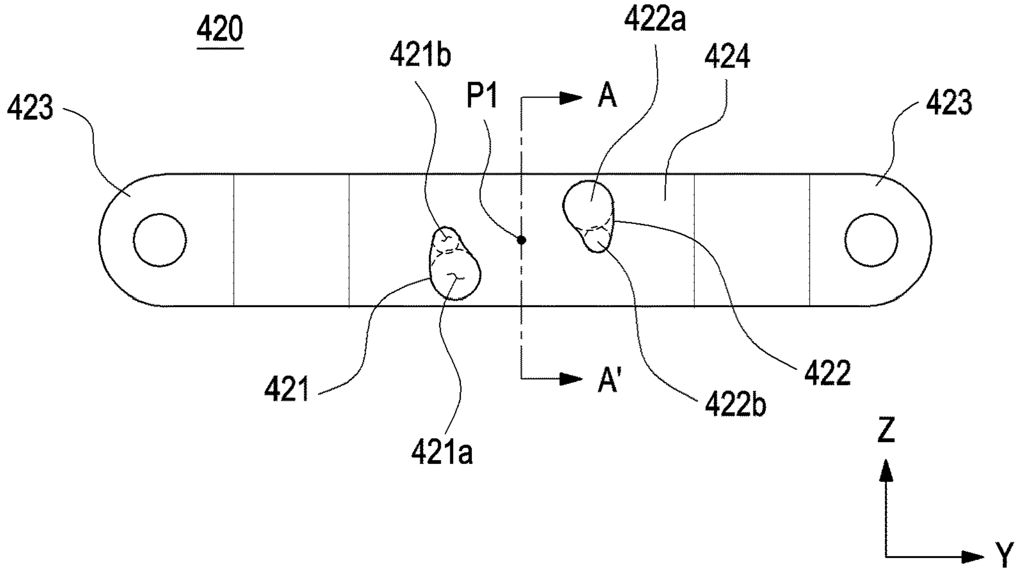
FIG. 6A is a bottom view of a bracket according to an embodiment of the disclosure.

FIG. 6A is a bottom view of a bracket according to an embodiment of the disclosure.

Figure 6B:
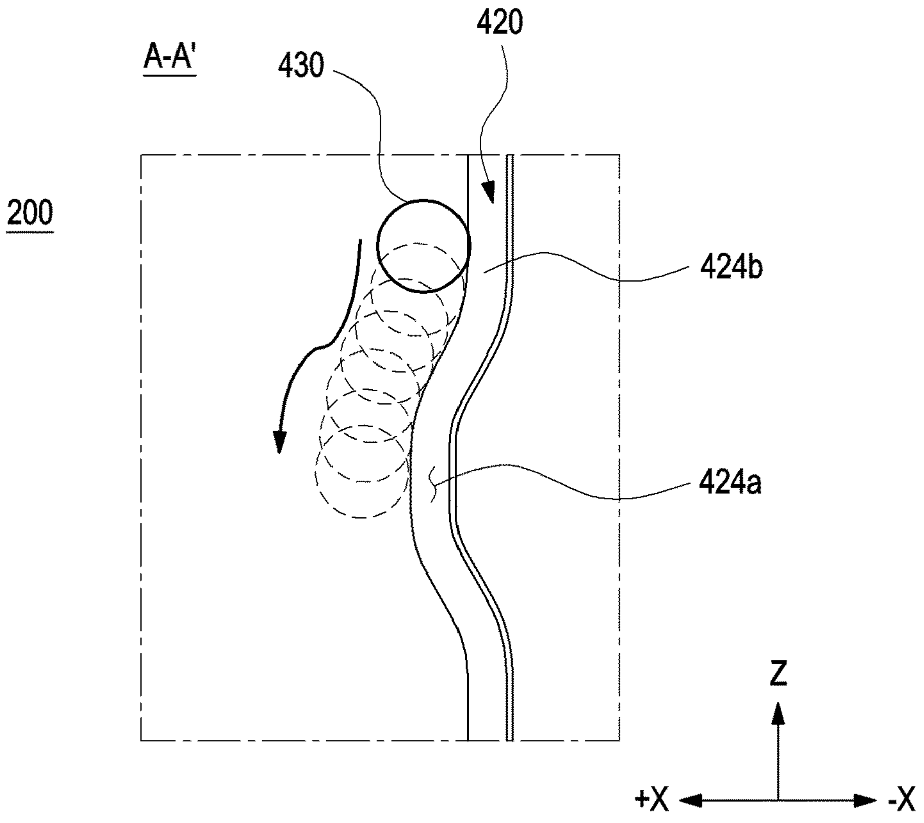
FIG. 6B is a cross-sectional view of FIG. 6A, taken along line A-A' according to an embodiment of the disclosure.
Figure 7:
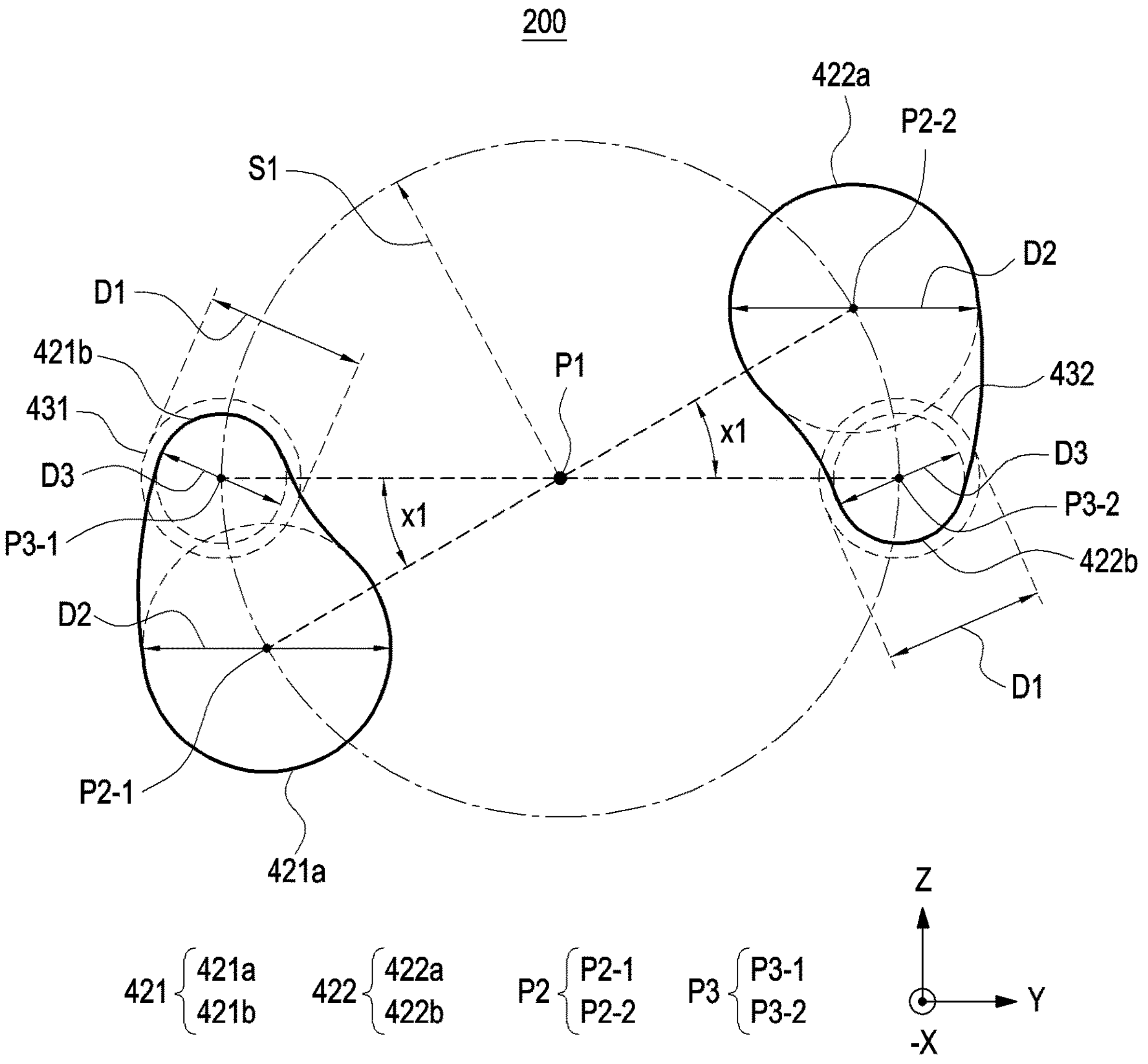
FIG. 7 is a schematic diagram illustrating a connection between a connecting member and a bracket according to an embodiment of the disclosure.

FIG. 6B is a cross-sectional view of FIG. 6A, taken along line A-A'. FIG. 7 is a schematic view illustrating a connection between a connecting member and a bracket according to an embodiment of the disclosure.

Referring to FIGS. 6A, 6B, and 7, the bracket 420 may include a first through hole 421 and a second through hole 422. The configurations of the bracket 420 and the connecting member 430 in FIGS. 6A, 6B, and/or 7 may be entirely or partially the same as the configurations of the bracket 420 and the connecting member 430 in FIGS. 4 and 5.

According to various embodiments, the through holes 421 and 422 may include separation areas 421*a* and 422*a* and fastening areas 421*b* and 422*b*. For example, the first through hole 421 may include a first separation area 421*a* and a first fastening area 421*b*, and the second through hole 422 may include a second separation area 422*a* and a second fastening area 422*b*. According to an embodiment, the first through hole 421 and the second through hole 422 may be formed to be spaced apart from each other by a first length S1 with respect to the first point P1. For example, the first through hole 421 and the second through hole 422 may be formed to be substantially symmetrical with respect to the first point P1 of the bracket 420.

According to various embodiments, the through holes 421 and 422 may be formed in a teardrop shape. For example, the first fastening area 421*b* may be interpreted as part of the first through hole 421 extending from the first separation area 421*a*, and the second fastening area 422*b* may be interpreted as part of the second through hole 422 extending from the second separation area 422*a*. According to an embodiment, the first separation area 421*a* and the second separation area 422*a* may be formed to have a second diameter D2, and the first fastening area 421*b* and the second fastening area 422*b* may be formed to have a third diameter D3. The size of the second diameter D2 may be greater than the size of the third diameter D3. According to an embodiment, the first separation area 421*a* and the second separation area 422*a* may be empty spaces having a second diameter D2 at the second point P2, which is spaced apart from the first point P1 of the bracket 420 by the first length S1. According to an embodiment, the second point P2 may include a point P2-1 and a point P2-2 which are located symmetrically with respect to the first point P1. According to an embodiment, the first separation area 421*a* may be formed around the point P2-1, and the second separation area 422*a* may be formed around the point P2-2. According to an embodiment, the protruding areas 431 and 432 of the connecting member 430 may be separated from or inserted into the bracket 420 at the second point P2. For example, the third diameter D3 of the protruding areas 431 and 432 may be formed to be smaller than the second diameter D2 of the separation areas 421*a* and 422*a*, and when at least a portion (e.g., the central portion) of the protruding areas 431 and 432 is located at the second point P2, the protruding areas 431 and 432 may not come into contact with the surface of the bracket 420. The first fastening area 421*b* and the second fastening area 422*b* may be empty spaces having a third diameter D3 at the third point P3 spaced apart from the first point P1 by the first length S1. According to an embodiment, the third point P3 may include a point P3-1 and a point P3-2, which are symmetrically located with respect to the first point P1. According to an embodiment, the first fastening area 421*b* may be formed around the point P3-1, and the second fastening area 422*b* may be formed around the point P3-2.

According to various embodiments, the connecting member 430 may be coupled to or separated from the bracket 420 based on the angle between the connecting member 430 and the bracket 420. According to an embodiment, the first protruding area 431 and the second protruding area 432 may be formed to have a first diameter D1. The first diameter D1 may be less than or equal to the second diameter D2 of the separation areas 421*a* and 422*a*, and may be greater than the third diameter D3 of the fastening areas 421*b* and 422*b*.

According to various embodiments, when the connecting member 430 is located at the second point P2 of the bracket 420, the connecting member 430 and/or the coupling member (e.g., the coupling member 440 of FIG. 4) connected to the connecting member 430 may slide relative to the bracket 420 and/or the housing (e.g., the housing 410 of FIG. 4) connected to the bracket 420. For example, when at least a portion of the protruding areas 431 and 432 is located at the second point P2, a portion (e.g., the first protruding area 431 and/or the second protruding area 432) of the connecting member 430 may be inserted into the separation areas 421*a* and 422*a* of the through holes 421 and 422 or may be separated from the separation areas 421*a* and 422*a* of the through holes 421 and 422. For example, when at least a portion of the protruding areas 431 and 432 is located at the second point P2, the connecting member 430 may move in a first direction (e.g., the first direction (+X direction) of FIG. 4) or a second direction (−X direction) with respect to the bracket 420.

According to various embodiments, when the connecting member 430 is located within the first angular range x1 with respect to the bracket 420, the connecting member 430 and/or the coupling member (e.g., the coupling member 440 of FIG. 4) connected to the connecting member 430 may rotate with respect to the bracket 420 and/or the housing (e.g., the housing 410 of FIG. 4) connected to the bracket 420 within the first angular range x1. For example, a portion (e.g., the first protruding area 431 and/or the second protruding area 432) of the connecting member 430 inserted into the through holes 421 and 422 may rotate within the first angular range x1. According to an embodiment, the first angular range x1 may be an angle between the second point P2 and the third point P3, which are formed based on the first point P1. According to an embodiment, in a state in which the protruding areas 431 and 432 of the connecting member 430 are inserted into the through holes 421 and 422 of the bracket 420, the connecting member 430 may be connected to the bracket 420 with the protruding areas 431 and 432 located at the third point P3.

According to various embodiments, at least a portion of the bracket 420 may be bent. For example, the second bracket area 424 may protrude further than the first bracket area 423 in a first direction (e.g., the +X direction). According to an embodiment, the second bracket area 424 may be bent to guide the movement of the connecting member 430. For example, the second bracket area 424 may include a (2-2) bracket area 424*b*, and a (2-1) bracket area 424*a* that is closer than the (2-2) bracket area 424*b* to a housing (e.g., the housing 410 of FIG. 4). According to an embodiment, the (2-1) bracket area 424*a* may be at least partially surrounded by the (2-2) bracket area 424*b*. According to an embodiment, when viewing the bracket 420 mounted on the housing 410 from the outside of the electronic device 200, the (2-1) bracket area 424*a* may be interpreted as a groove structure extending from the (2-2) bracket area 424*b*. For example, the (2-1) bracket area 424*a* may protrude in a first direction (+X direction) toward a housing (e.g., the housing 410 of FIG. 4) from the (2-2) bracket area 424*b*. According to an embodiment, the bracket 420 may be shaped to facilitate the movement of the connecting member 430 in the first direction (+X direction) toward the housing 410 when the connecting member 430 is inserted into the bracket 420. For example, after the connecting member 430 is inserted into the bracket 420, the connecting member 430 may be moved to the (2-1) bracket area 424*a* through the (2-2) bracket area 424*b* based on the height difference (e.g., the length in the X-axis direction) between the (2-2) bracket area 424*b* and the (2-1) bracket area 424*a*. The connecting member 430 may be guided by the (2-1) bracket area 424*a* and/or the (2-2) bracket area 424*b* to move towards the fastening areas 421*b* and 422*b* of the through holes 421 and 422.

Figure 8:
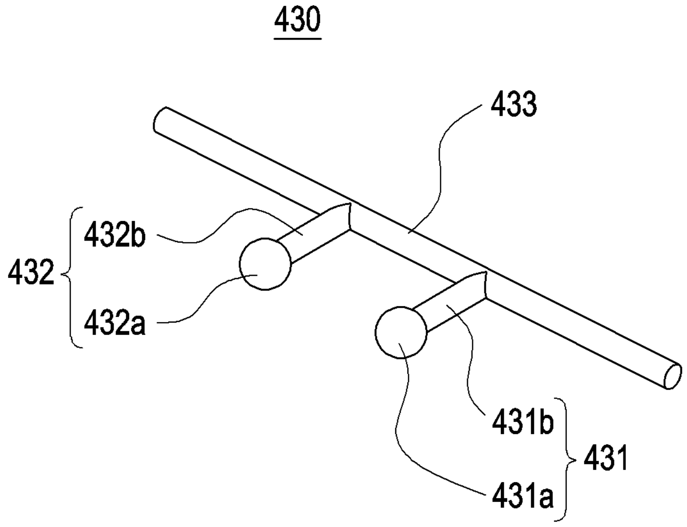
FIG. 8 is a perspective view of a connecting member according to an embodiment of the disclosure.

FIG. 8 is a perspective view of a connecting member according to an embodiment of the disclosure.

Referring to FIG. 8, the connecting member 430 may include a first protruding area 431, a second protruding area 432, and a bar structure 443. The configuration of the connecting member 430 in FIG. 8 may be entirely or partially the same as the configuration of the connecting member 430 in FIG. 4.

According to various embodiments, the first protruding area 431 may include a (1-1) protruding area 431*a* formed in a substantially spherical shape and a (1-2) protruding area 431*b* connecting the (1-1) protruding area 431*a* and the bar structure 433, and the second protruding area 432 may include a (2-1) protruding area 432*a* formed in a substantially spherical shape and a (2-2) protruding area 432*b* connecting the (2-1) protruding area 432*a* and the bar structure 433. According to an embodiment, when the connecting member 430 is connected or coupled to the bracket 420, the (1-1) protruding area 431*a* and the (2-1) protruding area 432*a* may be located between the housing (e.g., the housing 410 of FIG. 4) and the bracket (e.g., the bracket 420 of FIG. 4). According to an embodiment, the (1-2) protruding area 431*b* and the (2-2) protruding area 432*b* may be formed in a substantially bar or rod shape. According to an embodiment, the (1-2) protruding area 431*b* may be interpreted as a first connecting structure for connecting the (1-1) protruding area 431*a* and the bar structure 433, and the (2-2) protruding area 432*b* may be interpreted as a second connecting structure for connecting the (1-2) protruding area 431*b* and the bar structure 433. According to an embodiment, a fourth diameter D4 of the (1-2) protruding area 431*b* and/or the (2-2) protruding area 432*b* may be formed to be smaller than the first diameter D1 of the (1-1) protruding area 431*a* and/or the (2-1) protruding area 432*a*. According to an embodiment, the (1-2) protruding area 431*b* and the (2-2) protruding area 432*b* may be disposed or formed substantially parallel to each other. According to an embodiment, the (1-1) protruding area 431*a* may be connected to the (1-2) protruding area 431*b*, and the (2-1) protruding area 432*a* may be connected to the (2-2) protruding area 432*b*. For example, the (1-2) protruding area 431*b* may be connected to the (1-1) protruding area 431*a* using a fitting coupling, and the (2-2) protruding area 432*b* may be connected to the (2-1) protruding area 432*a* using a fitting coupling. According to another embodiment, the (1-1) protruding area 431*a* and the (1-2) protruding area 431*b*, as well as the (2-1) protruding area 432*a* and the (2-2) protruding area 432*b*, may be integrally formed, respectively. According to an embodiment, with the coupling member (e.g., the coupling member 440 of FIG. 4) connected to the housing (e.g., the housing 410 of FIG. 4), at least a portion of the first protruding area 431 (e.g., the (1-1) protruding area 431*a*) and at least a portion of the second protruding area 432 (e.g., the (2-1) protruding area 432*a*) may be located between the second bracket area (e.g., the second bracket area 424 of FIG. 6A) and the housing 410.

Figure 9:
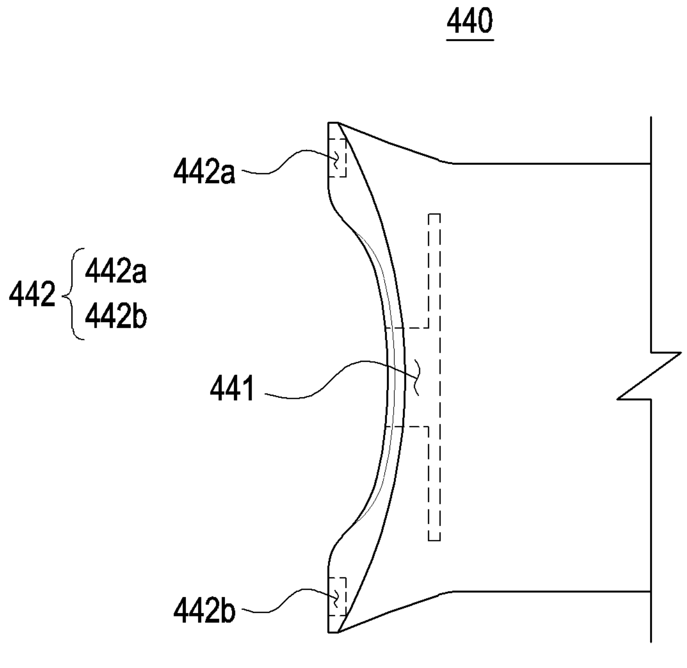
FIG. 9 is a top view of a coupling member according to an embodiment of the disclosure.

FIG. 9 is a top view of a coupling member according to an embodiment of the disclosure.

Referring to FIG. 9, the coupling member 440 may include an inner space 441 and at least one accommodating groove 442. The configuration of the coupling member 440 in FIG. 9 may be entirely or partially the same as the configuration of the coupling member 440 in FIG. 4.

According to various embodiments, the inner space 441 may accommodate at least a portion of a connecting member (e.g., the connecting member 430 of FIG. 8). For example, the inner space 441 may be a groove or recess formed on one surface of the coupling member 440 to face the housing 410. According to an embodiment, a portion (e.g., the bar structure 433, the (1-2) protruding area 431*b*, and the (2-2) protruding area 432*b* of FIG. 7) of the connecting member 430 may be disposed within the inner space 441. According to an embodiment, other portions (e.g., the (1-1) protrusion area 431*a* and the (1-2) protrusion area 431*b*) of the connecting member 430 may be exposed to the outside of the coupling member 440 when the connection member 430 is coupled to the coupling member 440. According to an embodiment, the coupling member 440 may include a substantially rigid material (e.g., metal or synthetic resin (e.g., plastic)) (not shown), and at least a portion of the inner space 441 may be interpreted as an empty space surrounded by the rigid material. According to an embodiment, the rigid material may be connected to a flexible material of the coupling member 440 using at least one method of insert injection molding, double injection molding, assembly, or adhesion. According to an embodiment, the connecting member 430 disposed within the inner space 441 may be connected to the rigid material of the coupling member 440. The coupling force between the connecting member 430 connected to the rigid material and the coupling member 440 may be greater than the coupling force between the connecting member 430 connected to the flexible material and the coupling member 440.

According to various embodiments, the accommodating groove 442 may accommodate at least a portion of a fastening member (e.g., the fastening member 450 of FIG. 4). According to an embodiment, in the state where the coupling member 440 is connected to the housing (e.g., the housing 410 of FIG. 4), some portions of the fastening member 450 may be located within the accommodating groove 442, and other portions may be located within the coupling groove 414 of the housing 410 and the coupling hole (e.g., the coupling hole 427 of FIG. 4) of the bracket (e.g., the bracket 420 of FIG. 4). According to an embodiment, the use of the accommodating groove 442 may reduce or prevent unintended rotation of the coupling member 440 with respect to the housing 410. According to an embodiment, in the state where the coupling member 440 is coupled to the housing 410, the accommodating groove 442 may face the coupling groove 414 and the coupling hole 427 of FIG. 4. According to an embodiment, the accommodating groove 442 may include a first accommodating groove 442*a* and a second accommodating groove 442*b*. The first accommodating groove 442*a* and the second accommodating groove 442*b* may each accommodate the coupling member 440. According to an embodiment, at least a portion of the inner space 441 may be located between the first accommodating groove 442*a* and the second accommodating groove 442*b*.

Figure 10A:
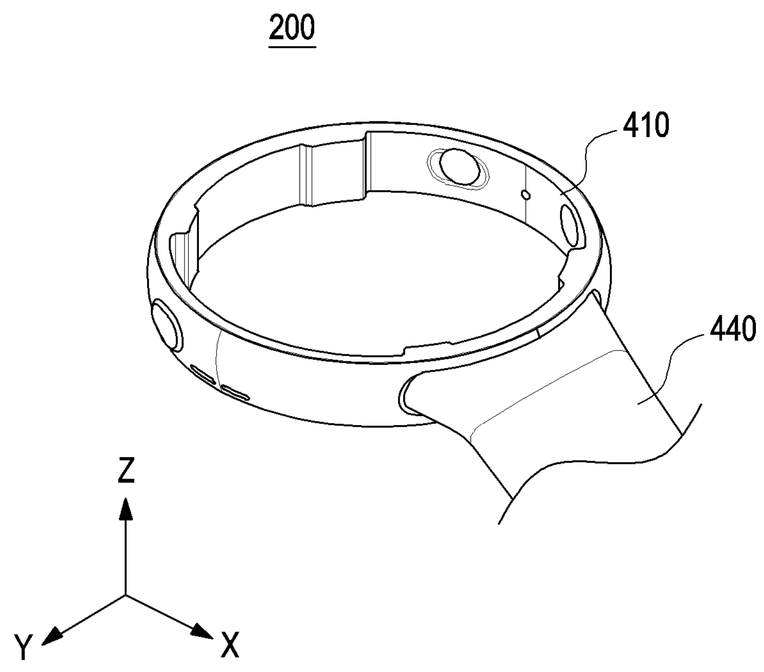
FIGS. 10A and 10B are diagrams for illustrating an operation of a coupling member being fastened to a housing according to various embodiments of the disclosure.
Figure 10B:
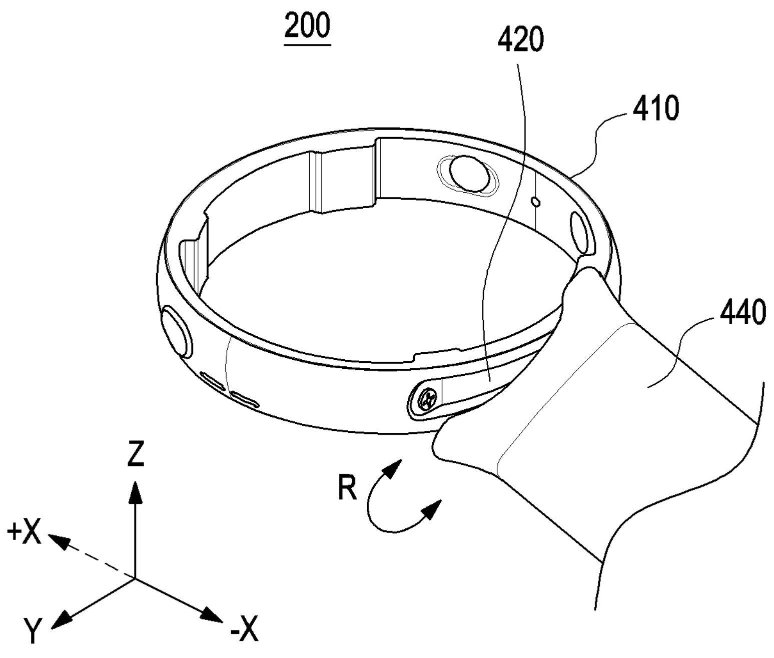

FIGS. 10A and 10B are views illustrating an operation of a coupling member being fastened to a housing according to various embodiments of the disclosure.

For example, FIG. 10A is a view illustrating a state in which the coupling member 440 is fully fastened to the housing 410, and FIG. 10B is a view illustrating a state in which the coupling member 440 is inserted into the housing 410.

Referring to FIGS. 10A and 10B, the coupling member 440 may be coupled to the housing 410 using the bracket 420. The configurations of the housing 410, the bracket 420, and the coupling member 440 in FIGS. 10A and 10B may be entirely or partially the same as the configurations of the housing 410, the bracket 420, and the coupling member 440 in FIG. 4.

According to various embodiments, the coupling member 440 may be connected to or separated from the bracket 420, which is coupled to the housing 410, using a connecting member (e.g., the connecting member 430 of FIG. 8). According to an embodiment, the coupling member 440 may be connected to the bracket 420 while remaining in a tilted state with respect to the housing 410. For example, the protruding areas (e.g., the protruding areas 431 and 432 of FIG. 8) of the connecting member 430 connected to the coupling member 440 may be inserted into the through holes (e.g., the through holes 421 and 422 of FIG. 4) of the bracket 420 in the first direction (e.g., the +X direction). For example, the protruding areas 431 and 432 may be inserted into separation areas (e.g., the separation areas 421*a* and 422*a* of FIG. 6A) of the bracket 420. According to an embodiment, the coupling member 440 may be coupled to the housing 410 and/or the bracket 420 by rotating with respect to the housing 410 and/or the bracket 420 while being inserted into the bracket 420 (e.g., FIG. 10B). For example, as the coupling member 440 rotates (e.g., twists) with respect to the housing 410 and/or the bracket 420 in a rotation direction R substantially perpendicular to the first direction, the protruding areas 431 and 432 may be located within the fastening areas (e.g., the fastening areas 421*b* and 422*b* of FIG. 6A) of the bracket 420 (e.g., FIG. 10A). When the protruding areas 431 and 432 are located in the fastening areas 421*b* and 422*b*, the coupling member 440 may be prevented or reduced from separating from the housing 410 and/or the bracket 420. According to an embodiment, the coupling member 440 may be separated from the housing 410 and/or the bracket 420 by moving in a second direction (−X direction), which is opposite to the first direction (+X direction), while remaining in a tilted state (e.g., FIG. 10B) with respect to the housing 410.

According to various embodiments of the disclosure, an electronic device (e.g., the electronic device 200 of FIG. 1) may include a housing (e.g., the housing 210 of FIG. 1); at least one coupling member (e.g., the coupling members 250 and 260 of FIG. 1) configured to be connected to the housing; a bracket (e.g., the bracket 420 of FIG. 4) disposed between the housing and the at least one coupling member and including a first through hole (e.g., the first through hole 421 of FIG. 4) and a second through hole (e.g., the second through hole 422 of FIG. 4); and a connecting member (e.g., the connecting member 430 of FIG. 4) at least partially disposed in the at least one coupling member and including a first protruding area (e.g., the first protruding area 431 of FIG. 4) configured to be inserted into the first through hole and a second protruding area (e.g., the second protruding area 432 of FIG. 4) configured to be inserted into the second through hole, wherein the first through hole and the second through hole may be formed to be spaced apart from each other by a first length (e.g., the first specified length S1 of FIG. 7) with respect to a first point (e.g., the first point P1 of FIG. 7) located between the first through hole and the second through hole, and wherein the first protruding area may be configured to rotate within a first angular range (e.g., the first angular range x1 of FIG. 7) in a first through hole, and the second protruding area may be configured to rotate within the first angular range in the second through hole.

According to various embodiments, the first through hole and the second through hole may include a separation area (e.g., the separation areas 421*a* or 422*a* of FIG. 7) at least partially located at a second point spaced apart from the first point by the first length and at least partially formed to have a second diameter (e.g., the second diameter D2 of FIG. 7), and a fastening area (e.g., the fastening area 421*b* or 422*b* of FIG. 7) extending from the separation area and at least partially formed to have a third diameter (e.g., the third diameter D3 of FIG. 7) shorter than a length of the second diameter, wherein the first protruding area and the second protruding area may be configured to be inserted into or separated from the bracket in the separation area.

According to various embodiments, the first protruding area and the second protruding area may be formed to have a first diameter (e.g., the first diameter D1 of FIG. 5), and a length of the first diameter may be shorter than the length of the second diameter and may be longer than a length of the third diameter.

According to various embodiments, the bracket may include at least one first bracket area (e.g., the first bracket area 423 of FIG. 4) connected to the housing, and a second bracket area (e.g., the second bracket area 424 of FIG. 4) extending from the at least one first bracket area and in which the first through hole and the second through hole are located, wherein the second bracket area may be spaced apart from the housing.

According to various embodiments, the second bracket area may include a (2-1) bracket area (e.g., the (2-1) bracket area 424*a* of FIG. 7) for guiding rotation of the first protruding area and the second protruding area, and a (2-2) bracket area (e.g., the (2-2) bracket area 424*b* of FIG. 7) surrounding at least a portion of the (2-1) bracket area, wherein the (2-1) bracket area may be closer than the (2-2) bracket area to the housing.

According to various embodiments, at least a portion of the first protruding area and at least a portion of the second protruding area may be configured to be located between the second bracket area and the housing.

According to various embodiments, the at least one coupling member may include an inner space (e.g., the inner space 441 of FIG. 9) for accommodating at least a portion of the connecting member.

According to various embodiments, the first through hole and the second through hole may be symmetrical with respect to the first point.

According to various embodiments, the connecting member may include a bar structure (e.g., the bar structure 433 of FIG. 8) connected to the first protruding area and the second protruding area.

According to various embodiments, the first protruding area may include a (1-1) protruding area (e.g., the (1-1) protruding area 431*a* of FIG. 8) formed in a substantially spherical shape, and a (1-2) protruding area (e.g., the (1-2) protruding area 431*b* of FIG. 8) connected to the (1-1) protruding area and the bar structure, and the second protruding area may include a (2-1) protruding area (e.g., the (2-1) protruding area 432*a* of FIG. 8) formed in a substantially spherical shape, and a (2-2) protruding area (e.g., the (2-2) protruding area 432*b* of FIG. 8) connected to the (2-1) protruding area and the bar structure.

According to various embodiments, the electronic device may further include at least one fastening member (e.g., the fastening member 450 of FIG. 4) connected to the bracket and the housing.

According to various embodiments, the housing may include at least one coupling groove (e.g., the coupling groove 414 of FIG. 4) configured to accommodate the at least one fastening member, and the bracket may include at least one coupling hole (e.g., the coupling hole 427 of FIG. 4) configured to accommodate the at least one fastening member and correspond to the at least one coupling groove.

According to various embodiments, the at least one coupling member may include at least one accommodating groove (e.g., the accommodating groove 442 of FIG. 8) for accommodating at least a portion of the at least one fastening member.

According to various embodiments, the housing, the bracket, and the connecting member may include at least one of stainless steel, aluminum, or titanium.

According to various embodiments of the disclosure, an electronic device (e.g., the electronic device 200 of FIG. 2) may include a housing (e.g., the housing 410 of FIG. 4); at least one coupling member (e.g., the coupling member 440 of FIG. 4) configured to be connected to the housing; a bracket (e.g., the bracket 420 of FIG. 4) disposed between the housing and the at least one coupling member and including a first through hole (e.g., the first through hole 421 of FIG. 4) and a second through hole (e.g., the second through hole 422 of FIG. 4); and a connecting member (e.g., the connecting member 430 of FIG. 4) at least partially disposed in the at least one coupling member, the connecting member including a first protruding area (e.g., the first protruding area 431 of FIG. 4) configured to be inserted into the first through hole and a second protruding area (e.g., the second protruding area 432 of FIG. 4) configured to be inserted into the second through hole, wherein the first through hole and the second through hole may include a separation area (e.g., the first separation area 421*a* and the second separation area 422*a* of FIG. 6A) at least partially formed to have a second diameter (e.g., the second diameter D2 of FIG. 7), and a fastening area (e.g., the first fastening area 421*b* and the second fastening area 422*b* of FIG. 6A) extending from the separation area and at least partially formed to have a third diameter (e.g., the third diameter D3 of FIG. 7) shorter than the length of the second diameter, and wherein the first protruding area and the second protruding area may be formed to have a first diameter (e.g., the first diameter D1 of FIG. 7), and a length of a first diameter may be shorter than the length of the second diameter and longer than a length of the third diameter.

According to various embodiments, the bracket may include at least one first bracket area (e.g., the first bracket area 423 of FIG. 6A) connected to the housing, and a second bracket area (e.g., the second bracket area 424 of FIG. 6A) extending from the at least one first bracket area and in which the first through hole and the second through hole are located, wherein the second bracket area may be spaced apart from the housing.

According to various embodiments, the connecting member may include a bar structure (e.g., the bar structure 433 of FIG. 8) connected to the first protruding area and the second protruding area, and the first protruding area may include a (1-1) protruding area (e.g., the (1-1) protruding area 431*a* of FIG. 8) formed in a substantially spherical shape, and a (1-2) protruding area (e.g., the (1-2) protruding area 431*b* of FIG. 8) connected to the (1-1) protruding area and the bar structure, and the second protruding area may include a (2-1) protruding area (e.g., the (2-1) protruding area 432*a* of FIG. 8) formed in a substantially spherical shape, and a (2-2) protruding area (e.g., the (2-2) protruding area 432*b* of FIG. 8) connected to the (2-1) protruding area and the bar structure.

According to various embodiments, the electronic device may further include at least one fastening member (e.g., the fastening member 450 of FIG. 4) connected to the bracket and the housing.

According to various embodiments, the housing may include at least one coupling groove (e.g., the coupling groove 414 in FIG. 4) configured to accommodate the at least one fastening member; the bracket may include at least one coupling hole (e.g., the coupling hole 427 in FIG. 4) configured to accommodate the at least one fastening member and correspond to the at least one coupling groove; and the at least one coupling member may include at least one accommodating groove (e.g., the accommodating groove 442 in FIG. 8) configured to accommodate at least a portion of the at least one fastening member.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable electronic device comprising:

a housing;

at least one coupling member configured to be connected to the housing;

a bracket disposed between the housing and the at least one coupling member, the bracket including a first through hole and a second through hole; and a connecting member at least partially disposed in the at least one coupling member, the connecting member including a first protruding area configured to be inserted into the first through hole and a second protruding area configured to be inserted into the second through hole, wherein the first through hole and the second through hole are formed to be spaced apart by a first length with respect to a first point located between the first through hole and the second through hole, and wherein the first protruding area is configured to rotate within a first angular range in the first through hole, and the second protruding area is configured to rotate within the first angular range in the second through hole.

2. The wearable electronic device of claim 1, wherein the first through hole and the second through hole include:

a separation area at least partially located at a second point spaced apart from the first point by the first length and at least partially formed to have a second diameter; and a fastening area extending from the separation area and at least partially formed to have a third diameter shorter than a length of the second diameter, and wherein the first protruding area and the second protruding area are configured to be inserted into or separated from the bracket in the separation area.

3. The wearable electronic device of claim 2, wherein the first protruding area and the second protruding area are formed to have a first diameter, and wherein a length of the first diameter is shorter than the length of the second diameter and longer than a length of the third diameter.

4. The wearable electronic device of claim 1, wherein the bracket includes at least one first bracket area connected to the housing, and a second bracket area extending from the at least one first bracket area and in which the first through hole and the second through hole are located, and wherein the second bracket area is separated from the housing.

5. The wearable electronic device of claim 4, wherein the second bracket area includes a (2-1) bracket area configured to guide rotation of the first protruding area and the second protruding area, and a (2-2) bracket area configured to surround at least a portion of the (2-1) bracket area, and wherein the (2-1) bracket area is closer than the (2-2) bracket area to the housing.

6. The wearable electronic device of claim 4, wherein at least a portion of the first protruding area and at least a portion of the second protruding area are located between the second bracket area and the housing while the at least one coupling member is connected to the housing.

7. The wearable electronic device of claim 1, wherein the at least one coupling member includes an inner space for accommodating at least a portion of the connecting member.

8. The wearable electronic device of claim 1, wherein the first through hole and the second through hole are symmetrical with respect to the first point.

9. The wearable electronic device of claim 1, wherein the connecting member includes a bar structure connected to the first protruding area and the second protruding area.

10. The wearable electronic device of claim 9, wherein the first protruding area includes a (1-1) protruding area formed in a substantially spherical shape, and a (1-2) protruding area connected to the (1-1) protruding area and the bar structure, and wherein the second protruding area includes a (2-1) protruding area formed in a substantially spherical shape, and a (2-2) protruding area connected to the (2-1) protruding area and the bar structure.

11. The wearable electronic device of claim 1, further comprising:

at least one fastening member connected to the bracket and the housing.

12. The wearable electronic device of claim 11, wherein the housing includes at least one coupling groove for accommodating the at least one fastening member, and wherein the bracket includes at least one coupling hole configured to accommodate the at least one fastening member and to correspond to the at least one coupling groove.

13. The wearable electronic device of claim 12, wherein the at least one coupling member includes at least one accommodating groove for accommodating at least a portion of the at least one fastening member.

14. The wearable electronic device of claim 11, wherein the housing includes an accommodating groove configured to accommodate at least a portion of the at least one fastening member and at least a portion of the bracket.

15. The wearable electronic device of claim 1, wherein the housing, the bracket, and the connecting member include at least one of stainless steel, aluminum, or titanium.

* * * * *